United States Patent Office 3,147,222
Patented Sept. 1, 1964

3,147,222
COMPOSITIONS COMPRISING A PETROLEUM
LIQUID AND AN N-VINYL PYRROLIDINONE
POLYMER
La Verne N. Bauer, Cheltenham, Pa., assignor to Rohm &
Haas Company, Philadelphia, Pa., a corporation of
Delaware
No Drawing. Filed Mar. 5, 1958, Ser. No. 719,207
16 Claims. (Cl. 252—51.5)

This invention concerns compositions comprising a liquid petroleum product having dissolved therein at least one polymer containing units from an N-vinyl pyrrolidinone and from one or more esters of acrylic or methacrylic acid with or without other polymerizable monovinylidene compound. The esters are used in proportions ensuring solubility of the polymer in petroleum liquids, the units from the N-vinyl pyrrolidinone comprising between 5% and about 30% by weight of the resulting copolymer.

This application is a continuation-in-part of application Serial No. 529,585, filed August 19, 1955.

In one type of these compositions a copolymer is dissolved in a fuel oil in an amount sufficient to disperse any gummy or resinous material which may form therein. In another type of composition a copolymer is dissolved in an oil having lubricating properties, the amount of copolymer present being sufficient to disperse gums or resins which tend to form therein while in use in combustion engines.

A need has arisen for oil-soluble dispersing agents which are free of inorganic components which give ash. Such agents could serve to disperse gums, resins, and sludges which form in internal combustion engines as a result of incomplete combustion of fuel and decomposition of lubricants.

There is a particular need for ashless dispersants which are effective at low operating temperatures of gasoline and compression-ignition engines and under conditions of intermittent service. At the same time such a dispersant must withstand conditions of relatively high temperature operation. It must resist shear and oxidation and be compatible with other additives which are now required in oils, such as anti-oxidants, stabilizers, wear-resisting agents, other detergents, especially heavy duty detergents, anti-rust agents, pour point depressants, viscosity index improvers, anti-foam agents, or dyes. It would be desirable to have agents which can act not only as dispersants but also for one or more of the purposes of various other additives and do so in relatively low proportions. It is desirable also to have dispersants which can be added to petroleum fuels, particularly to fuel oils from cracked distillates or fuel oils having an appreciable content of cracked distillates, and to jet fuels to disperse gums or resins which tend to form therein.

Several kinds of polymeric agents have been reported which supply dispersing action in liquid petroleum products. In general these lack some of the required properties, such as resistance to oxidation or compatibility with other needed additives or the capacity to supply a combination of properties which permits the use of a minimum number of additives and a low proportion of additives.

I have discovered compositions which contain a class of copolymers which meet the above requirements very well. They are formed from an N-vinyl pyrrolidinone and at least one alkyl acrylate or methacrylate in which the alkyl group or groups are of sufficient size to ensure solubility of the copolymer in the liquid petroleum product to which it is to be applied. When the copolymer contains units from an N-vinyl pyrrolidinone in an amount between 5% and 30% by weight, it exhibits dispersing action against asphaltenes, gums, petroleum resins, and sludges which form in oils. The preferred content of an N-vinyl pyrrolidinone in the copolymer is between 6% and 15% by weight and the optimum is from 8% to 12% by weight.

The N-vinyl pyrrolidinones which have been found useful include N-vinyl pyrrolidinone itself, 3-methyl-1-vinyl pyrrolidinone, 4-methyl-1-vinyl pyrrolidinone, 5-methyl-1-vinyl-pyrrolidinone, 3-ethyl-1-vinyl-pyrrolidinone, 3-butyl-1-vinyl pyrrolidinone, 3,3-dimethyl-1-vinyl pyrrolidinone, 4,5-dimethyl-1-vinyl pyrrolidinone, 5,5-dimethyl-1-vinyl pyrrolidinone, 3,3,5-trimethyl-1-vinyl pyrrolidinone, 4-ethyl-1-vinyl-pyrrolidinone, 5-methyl-5-ethyl-1-vinyl pyrrolidinone, 3,4,5-trimethyl-3-ethyl-1-vinyl pyrrolidinone, and other lower alkyl substituted N-vinyl pyrrolidinones. As is known, these vinyl compounds are available through the reaction of acetylene on the parent pyrrolidinone in the presence of a strong base as catalyst.

The vinyl substituted pyrrolidinones may be represented by the structure

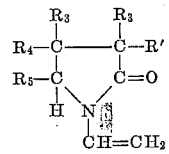

where the R's are lower alkyl groups. The preferred N-vinyl pyrrolidinones have a total carbon content of not over about ten.

The balance of the copolymer is based primarily upon alkylacrylates or methacrylates with alkyl groups at least up to octadecyl and of sufficient average size to ensure solubility in the liquid petroleum product which it is desired to treat. The higher the cut of petroleum product in general the greater the need for a larger alkyl group or average of alkyl groups. Thus, for use in a fuel oil there may be used a considerable proportion of butyl acrylate or methacrylate. Yet about 50% by weight of such butyl ester is about the maximum which can be incorporated into a copolymer with retention of good oil-solubility even in a fuel oil. The rest of the copolymer would then come from a comonomer having such a group or groups as dodecyl, myristyl, cetyl, or stearyl. Somewhat more hexyl, heptyl, or octyl acrylate or methacrylate can be used than in the case of the butyl esters to form copolymers of good oil-solubility and somewhat less of methyl, ethyl, or propyl acrylate or methacrylate. With dodecyl acrylate or methacrylate as the comonomer the coplymers are generally soluble in all kinds of liquid petroleum products. This is also true when higher alkyl groups are used.

When 30% to 80% by weight of the copolymer is obtained from cetyl and/or stearyl acrylate and/or methacrylate and there is also used one or more acrylates or methacrylates with not over 14 carbon atoms in the alkyl group along with at least 5% of an N-vinyl pyrrolidinone, the resulting copolymer acts as a pour point depressant in waxy oils as well as a dispersant. This is true whether the copolymer of at least the three comonomers is of relatively low or high molecular weight.

The copolymers of this invention act also as viscosity index improvers. They become in general more effective on this account as the molecular weight of the copolymer increases. With molecular weights increasing from about 1,000 to 70,000 or more (number average), improvement in the viscosity index becomes increasingly evident with good to fair stability against shear. As molecular weights increase about about 70,000, viscosity index will also increase, but with lower shear stability. Now if the copolymer contains sufficient units from an acrylic ester with alkyl groups of 16 or more carbon atoms, the copolymer supplies dispersancy-detergency, viscosity index improvement, and also pour point depressing action.

While it is preferred to use alkyl acrylates or methacrylates with four to 18 carbon atoms in the alkyl group or groups, there may also be used in small proportions silimal alkyl esters but with smaller or larger alkyl groups. It is thus possible to copolymerize a small proportion of ethyl, methyl or propyl acrylate or methacrylate, provided the combination of polymerizable esters provides the needed solubility in the oils to be treated, whether fuel or lubricating. The allowable proportion of such lower alkyl groups will depend on the size and proportion of higher alkyl substituents and the petroleum product in which the copolymer is to be dissolved.

There may also be used alkyl acrylates or methacrylates with alkyl groups larger than 18 carbon atoms. These are not ordinarily as readily available as cetyl and/or stearyl esters. These larger groups act similarly to cetyl or stearyl. There may thus be used tricosyl acrylate or methacrylate or tetracosyl acrylate or methacrylate.

It should also be mentioned that one or more other types of polymerizable monovinylidene compounds can be brought into copolymerization in minor proportions— that is, in proportions less than half of the polymerizable monovinylidene compounds other than an N-vinyl pyrrolidinone, provided any homopolymer which may form along with the copolymer does not interfere with the use of the copolymer, as from lack of solubility of the homopolymer in the particular oil being treated and provided this other monovinylidene compound can in fact enter into copolymerization.

Some typical comonomers which can be worked into the copolymers of this invention in minor amount include dibutyl itaconate, octadecyl butyl itaconate, didodecyl fumarate, cetyl butyl fumarate, vinyl acetate, vinyl laurate, vinyl stearate, vinyl octoate, vinyl butyl ether, vinyl octyl ether, vinyl dodecyl ether, vinyl octadecyl ether, vinyl tetradecyl thioether, vinyl butyl thioether, styrene, alkylstyrenes, butoxyethyl methacrylate, dodecyloxyethyl methacrylate, dodecyltrioethyl methacrylate, and dimethylaminoethyl acrylate or methacrylate.

One of the most interesting classes of minor substituents which can be introduced into the copolymers of an N-vinyl pyrrolidinone and alkyl acrylate or methacrylate consists of tert-aminoalkyl acrylates and methacrylates. N-alkyl groups forming the tertiary amine group are usually methyl or ethyl, but may be propyl or butyl. In their place there may be used the divalent saturated chains —$CH_2CH_2CH_2CH_2$—, —$CH_2CH_2CH_2CH_2CH_2$—, or —$CH_2CH_2OCH_2CH_2$—, which with the nitrogen form a heterocycle. The group attached to oxygen to form the ester is usually ethylene or propylene but it may also be larger, as butylene or pentylene.

These aminoalkyl esters may be represented by the formula

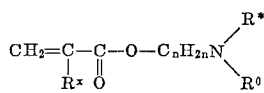

where $C_nH_{2n}$ is an alkylene chain of at least two carbon atoms between O and N, $n$ is a small integer, usually 2 or 3, $R^x$ is hydrogen or methyl, and $R^*$ and $R^0$ are lower alkyl (not over butyl) when taken individually or when taken together a saturated divalent aliphatic chain of 4 to 5 atoms which jointly with the nitrogen forms a monoheterocyclic amine.

These aminoalkyl esters are valuable comonomers for providing a basicity to the copolymer. They can advantageously provide for about 0.5% to about 10% of the copolymer. The presence in the copolymer of groups from the aminoalkyl esters improves dispersing action, especially in high temperature tests, but without the disadvantages which are shown by copolymers based on just the aminoalkyl acrylates (or methacrylates) and an alkyl acrylates and/or methacrylates. These latter copolymers are usually not compatible with various additives conventionally used in oils. In particular they are not compatible with the petroleum sulfonates which are effective as heavy duty and high temperature detergents. Also they are sensitive to oxidation. Yet when these aminoalkyl esters are used in the copolymers based on an N-vinyl pyrrolidinone and tert-aminoalkyl acrylate or methacrylate, they provide very good dispersing action for asphaltenes.

It is necessary that the portion of the copolymers of this invention derived from one or more acrylic esters have an alkyl portion which on average contains at least eight carbon atoms and in any case has an alkyl portion of sufficient size to ensure solubility in the petroleum liquid to which the copolymer is to be applied. The average alkyl group is, of course, calculated on a group or molar basis. The alkyl ester may have a single alkyl group of eight or more carbon atoms or there may be used a mixture of acrylates and/or methacrylates, provided there is this required balance of carbon atoms in the alcohol residue.

Copolymers useful in this invention have been described above by reference to the monomers from which they are formed. As has been shown, the copolymers for effective action utilize 5% to 30% by weight of an N-vinyl pyrrolidinone and up to 95% of at least one alkyl acrylate, or methacrylate, which may be replaced up to half thereof by at least one other polymerizable monovinylidene compound, the alkyl group or groups and any other polymerizable monovinylidene compound being selected and being proportioned to provide adequate solubility of the copolymer in the petroleum liquid to be treated. The copolymer, then, is composed of 5% to 30% by weight of an N-vinyl pyrolidinone, 36% to 95% of one or more alkyl acrylates or methacrylates (or both), and 0% to 47% of other copolymerizing monovinylidene compound.

In the following examples which are presented for purposes of illustration and not for purposes of limitation, there are described some typical preparations of copolymers of this invention. In general the comonomers are mixed in about the required proportions and are treated with a polymerization initiator, the resulting mixture is polymerized, usually by heating. Copolymerization is most conveniently carried out in a solvent, such as benzene, toluene, xylene, or aromatic naphtha, or in an oil When a volatile solvent is used, it may be distilled from the copolymer in the presence of an oil, which then displaces the volatile solvent. The resulting solution of copolymer in oil is convenient as a concentrate for addition to the petroleum liquid to be treated.

The polymerization initiator may be any of the usual free radical types, including peroxidic and azo. Typical azo catalysts are azodiisobutyronitrile, dimethylazodiisobutyrate, azodiisobutyramide, and other azo compounds wherein the azo group is acyclic and is preferably bonded to aliphatic carbons, at least one of which is tertiary. Typical peroxides are benzoyl peroxide, acetyl peroxide, caproyl peroxide, lauroyl peroxide, tert-butyl perbenzoate, di-tert-butyl diperphthalate, 2,2-bis(tert-butylperoxy)butane, methyl ethyl ketone peroxide, tert-butyl hydroperoxide, or cumene hydroperoxide. A particularly effective initiator system is developed by using a hydroperoxide together with a quaternary ammonium salt, such as diisobutylphenoxyethoxyethyldimethylbenzyl ammonium chloride, lauryldimethylbenzyl ammonium chloride, lauryldimethylcyclohexyl ammonium chloride, dodecylbenzyltrimethyl ammonium bromide, didodecenyldimethyl ammonium chloride, cetyltrimethyl ammonium chloride, cetylpyridinium chloride, or other quaternary ammonium salts which have alkyl, alkenyl, cycloalkyl, or aralkyl groups as N-substituents. The quaternary ammonium salt may be used from about 0.01% to 0.5% of the weight of the polymerizing mixture. The salt acts as an activator and helps to control molecular sizes of the copolymer as well as speeding up the rate of copolymerization.

Temperatures of polymerization are between 50° and 150° C. As polymerization proceeds, addition may be made of initiation solvent or comonomers, as desired. By adjustment of concentration, temperature, proportion of catalyst, solvent, and time, the copolymers can be prepared in the molecular sizes desired.

Parts are by weight unless otherwise designated.

*Example 1*

There are mixed 65 parts by weight of an alkyl methacrylate preparation in which the alkyl portion is obtained from a commercial cut of $C_{12}$ to $C_{18}$ fatty alcohols, 25 parts of butyl acrylate, and 10 parts of N-vinyl pyrrolidinone. Thereto, 0.075 part of benzoyl peroxide is added and the mixture is stirred and warmed to dissolve the peroxide. Addition is made of 20 parts of a white mineral oil to a reaction vessel which is swept out with nitrogen. The mixture of monomers is then slowly added over a two hour period to this oil. At 2.6 hours, addition is made of 0.015 part of benzoyl peroxide. At 4, 4.6, 5.3, and 6 hours, additions of 0.022 part of benzoyl peroxide are made and during this time and until 9-10 hours when heating is discontinued, temperatures are maintained between 97° and 103° C. At 6.5 hours, 28 parts of white mineral oil is added. The batch is stripped of volatile products by being heated up to 145° C. at 2 mm. pressure. The yield is about 90% of copolymer. The product is adjusted by addition of oil to copolymer content of 28.5% for addition to typical oils.

Addition of 0.02% of copolymer to an unstable fuel oil effectively prevents separation of gum or resin when this oil is heated in the presence of air for six hours. In the absence of this copolymer this oil rapidly forms a resin which plugs a fine screen.

Addition of this copolymer at 1.5% to a 180 neutral, solvent-extracted, Mid-Continent lubricating oil of 95 V.I. and 0° F. pour together with an inhibitor of the zinc dialkyldithiophosphate type and a small amount of an alkaline earth petroleum sulfonate gives a lubricating composition with a rating of 83 in the CRC FL-2 engine test. Without addition of copolymer the oil plus other additives gives a rating of 60. The oil containing 1.5% of this copolymer has a viscosity index of 140 and a pour point of −35° F. The viscosity of this composition is 67 Saybolt seconds (S.U.S.), at 210° F.

The designation CRC above refers to the Coordinating Research Council. The FL-2 is an engine test performed at low temperatures, that is, at temperatures at which moisture may be present in the crank case. Oils are rated in this test by the extent of deposits on pistons and cylinder walls.

The above copolymer is highly effective in dispersing asphaltenes in a test based on the Wood River Detergency Test (cf. Talley and Larsen, Ind. Eng. Chem. 15, 91-5 (1943)).

A sample of the above preparation adjusted to a 20% copolymer content in a white oil gives a viscosity of 216 cs. at 210° F.

Addition of 1% of this copolymer to a 150 Pennsylvania neutral oil having a pour point of +25° F. and a viscosity index of 106.9 depresses the pour point to −30° F. and raises the viscosity index to 130.

*Example 2*

There are mixed 70 parts of an alkyl methacrylate having alkyl groups of 12 and 14 carbon atoms, 30 parts of N-vinyl pyrrolidinone, and 0.8 part of dimethyl azodiisobutyrate. This mixture is slowly added to a stirred reaction vessel which is swept out with nitrogen and heated at 80° C., two hours being used for this addition. At 2.5 hours addition is made of 0.32 part of the azodiisobutyrate and 50 parts of toluene. At 4.0 hours addition is made of 0.12 part of the azodiisobutyrate and 20 parts of toluene. At 5.0 hours there is added 0.05 part of the azodiisobutyrate and at 25.5 hours 150 parts of toluene. The yield of copolymer is 90.3%. The product is mixed with 163 parts of a mineral oil and the mixture is heated at 140° C. under reduced pressure to remove volatile material, the time of stripping being one hour and the final pressure 2 mm. of mercury. The concentration of copolymer in oil is 36.9%. Adjusted to 30% in oil the solution gives a viscosity of 332 cs. at 210° F.

This copolymer is a very good dispersant for asphaltenes. It is an effective viscosity index improver. For example, in a 150 Pennsylvania neutral of +25° F. pour and 107 viscosity index it gives a V.I. of 135 at 1% of copolymer with a viscosity at 210° F. of 47 S.U.S. Shear stability is at least as good as any commercial methacrylate polymers used as V.I. improvers.

*Example 3*

A mixture of 70 parts of dodecyl arcylate, 30 parts of N-vinyl pyrrolidinone, 0.5 part of benzoyl peroxide, and 30 parts of toluene is slowly added during a two hour period to a stirred reaction vessel heated at 110°-120° C. which was blanketed with nitrogen. Heating thereafter was continued at 90°-100° C. At 2.4 hours addition is made of 100 parts of toluene and at 4.1 hours of 0.2 part, at 5.3 hours of 0.9 part, and at 6.3 hours of 0.37 part of benzoyl peroxide. Total time of heating is 22.5 hours. The copolymer yield is 98%. The copolymer is transferred in light petroleum oil by heating a mixture of toluene solution of copolymer and oil to 153° C. under pressures diminishing to 2 mm. after 30 minutes. A sample of the copolymer at 30% in toluene gives a viscosity of 165 cs. at 100° F.

This copolymer is a very good dispersant for asphaltenes and sludges occurring in used crank case oils. In a 150 Pennsylvania neutral oil of 107 viscosity index it gives a V.I. of 128 at 1% and of 138 at 2%.

*Example 4*

In the same way there are mixed 5 parts of N-vinyl pyrrolidinone, 95 parts of 99% pure dodecyl methacrylate, 0.5 part of benzoyl peroxide, and 15 parts of toluene. The mixture is heated as above under an inert atmosphere at 116° C. for the first two hours with the temperature decreasing gradually to 90° C. at the end of 22 hours. During heating additions of benzoyl peroxide amounted to 0.35 part by weight and of toluene of 78 parts. The yield of copolymer is 85%. A 30% solution thereof in toluene has a viscosity of 36.5 centistokes at 100° F.

This copolymer exhibits excellent shear stability and fair dispersancy.

*Example 5*

In the same way there are mixed 85 parts of a stearyl acrylate containing some cetyl and lauryl acrylates, 15 parts of N-vinyl pyrrolidiione, 20 parts of toluene, and 0.3 part of azodiisobutyronitrile. The mixture is heated under a nitrogen amtosphere at temperatures between 83° and 95° C. for 8.5 hours. Additions of azodiisobutyronitrile and toluene are made from time to time, 0.25 part additional catalyst and 31 parts of solvent being supplied. Time of heating is 8.5 hours. Yield of copolymer is 92.4%. A 30% solution of this copolymer in toluene has a viscosity of 82.2 cs. at 100° F.

This copolymer provides good dispersancy against asphaltenes and fair dispersancy for carbon black. It has excellent mechanical stability. It gives a moderate increase in viscosity index of typical lubricating oils. For example, at 2% copolymer in a solvent-extracted Mid-Continent oil of 170 S.U.S. at 100° F. and a V.I. of 97, it increased the V.I. to 126.

*Example 6*

The same procedure is followed with 75 parts of the same lot of stearyl acrylate and 25 parts of N-vinyl pyrrolidinone, but heating is continued for 22 hours. The yield of copolymer is 95%. A 30% solution of this copolymer in toluene has a viscosity of 259.2 cs. at 100° F.

This product is a most excellent dispersant for asphaltenes, crank case sludges, and carbon black. In a +25° F. pour 150 Pennsylvania neutral oil at 0.5% it gives a pour point of +5° F. Shear stability is acceptable. It has a favorable action in improving the viscosity index of typical oils. For example, in a 170 S.U.S. at 100° F. solvent-extracted Mid-Continent oil of 97 V.I. it gives a V.I. of 131, at 1% of copolymer and of 141 at 2%.

*Example 7*

There are mixed 65 parts of a cetyl-stearyl methacrylate, 25 parts of dodecyl methacrylate, 10 parts of N-vinyl-3-methyl pyrrolidinone, 25 parts of toluene, and 0.25 part of diisopropylbenzene hydroperoxide. About half of this mixture is added to a polymerization vessel equipped with stirrer, blanketed with nitrogen, and heated in an oil bath. The charge is heated to about 100° C. Thereupon 0.125 part of diisobutylphenoxyethoxyethyldimethylbenzyl ammonium chloride monohydrate dissolved in a little butanol is added. The temperature rises. The rest of the mixture is gradually introduced into the vessel with the temperature rising to 115°–120° C., at which level it is maintained for four hours. Temperature is then held at 101°–105° C. Small additions of toluene are made from time to time and also of the hydroperoxide and the quaternary ammonium salt in butanol. At 6.5 hours enough toluene is added to bring the copolymer content to about 30%. Total additions of the hydroperoxide are 0.168 part and of quaternary ammonium salt 0.027 part. Heating is discontinued after 7.5 hours. When the toluene solution is adjusted to exactly 30% nonvolatile content, it has a viscosity of 298 centistokes at 100° F.

This copolymer is transferred to a mineral oil by mixing the toluene solution with oil and heating the mixture under reduced pressure to an end point of 140° C./2 mm. This oil solution also with a 30% copolymer content is useful for supplying this copolymer to lubricating oils or to fuel oils.

The copolymer provides good dispersancy of asphaltenes in oils. At 1.5% in a 180 neutral solvent-extracted Mid-Continent oil of 95 V.I. and 0° F. pour the viscosity index is raised to 142 and the pour point is depressed to −30° F.

*Example 8*

The procedure of Example 7 is repeated with a mixture of 88.9 parts by weight of an ester of methaclylic acid and a commercial cut of higher alcohols which is essentially a mixture of dodecyl alcohol with some tetradecyl alcohol, and 11.1 parts of N-vinyl-3-methyl pyrrolidinone. The same catalyst and quaternary ammonium salt are used. The copolymer is obtained in a 90% yield. A 30% toluene solution of the copolymer has a viscosity of 205 centistokes at 100° F. The copolymer is likewise transferred to a white mineral oil as a convenient form for addition to oils. In a 150 S.U.S. Pennsylvania neutral oil at 33.5% it gives a viscosity of 701 cs. at 210° F.

This copolymer provides very good dispersancy of alphaltenes. It is acceptable in oils subjected to the Indiana oxidation test. In the FL–2 engine test it gives a score of 86 when used in conjunction with an inhibitor of the zinc dialkyldithiophosphate type.

*Example 9*

There are mixed 80 parts of a lauryl-myristyl methacrylate and 20 parts of N-vinyl 3,3,5-trimethylpyrrolidinone and then 0.24 part of a diisopropylbenzene hydroperoxide of 53% hydroperoxide content. There are charged to a polymerization vessel 5 parts of toluene, 20 parts of the above mixture, and a solution of 0.063 part of diisobutylphenoxyethyldimethylbenzyl ammonium chloride in 4.5 parts of butanol. This charge is heated under nitrogen to about 115° C. The rest of the monomer mixture is added in small increments over 1.8 hours. At 2.6, 4, 4.6, 5.3, and 6.5 hours additions of 5 parts of toluene are made and at 6.5 hours an addition of 100 parts of toluene is made. Five additions are made of diisopropylbenzene hydroperoxide for a total of 0.175 part and of the quaternary solution as above to a total of 1.02 parts. Polymerization is continued at about 113°–120° C. for four hours and at 100°–105° C. for 3.5 hours. A homogeneous, viscous solution of copolymer is obtained which contains 36.4% of non-volatile matter. A toluene solution of 30% copolymer has a viscosity of 191 centistokes at 100° F.

When this copolymer is transferred to an oil and solvent is removed there is obtained the usual solution in oil. The copolymer provides fairly good dispersancy of asphaltenes.

Repetition of the above procedure with a mixture of 70 parts of the same lauryl-myristyl methacrylate and 30 parts of N-vinyl-3,3,5-trimethyl pyrrolidinone leads to a similar copolymer. It gives very good dispersancy in oils. The higher content of the substituted N-vinyl pyrrolidinone seems to give improved results. On the other hand when a small amount of a tert-aminoalkyl methacrylate is introduced, the amount of substituted N-vinyl pyrrolidinone can be much reduced with retention of good detergency and of stability.

*Example 10*

There are mixed 90 parts of a lauryl-myristyl methacrylate, 2 parts of dimethylaminoethyl methacrylate, and 8 parts of N-vinyl-3,3,5-trimethyl pyrrolidinone and then 0.24 part of a 53% diisopropylbenzene hydroperoxide. About a fifth of this mixture is added to five parts of toluene in a polymerization vessel blanketed with nitrogen. The vessel is heated to about 120° C. and 0.063 part of diisobutylphenoxyethyldimethylbenzyl ammonium chloride in 4.5 parts of butanol added. The rest of the mixture is introduced to the reaction vessel in small increments. Then additional toluene, hydroperoxide, and quaternary ammonium salt are supplied as in Example 9 with heating continued at 115°–120° C. for four hours and 100°–105° C. for the next 3.5 hours. A homogeneous viscous solution is obtained containing 37% of copolymer. A 30% solution thereof in toluene has a viscosity of 490 centistokes at 100° F.

This copolymer is a good dispersant for asphaltenes and gives a score of about 81 in the FL–2 test when used in the test oil containing inhibitor. These compositions show good oxidation stability.

The above procedure is carried out with a mixture of 78 parts of the lauryl-myristyl methacrylate, 2 parts of dimethylaminoethyl methacrylate, and 20 parts of N-vinyl pyrrolidinone. The copolymer formed is much like that made just above except for a slight cloudiness. It is a good dispersant for asphaltenes and gives an FL–2 score of 88 in the test oil containing inhibitor with the copolymer at 1.3% and the inhibitor at 0.65%.

A composition comprising 0.65% of an inhibitor of the zinc dialkyldithiophosphate type, 1.5% of this copolymer, and 4.2% (by volume) of a commercial heavy duty detergent containing an alkaline-earth petroleum sulfonate gave an FL–2 rating of 90.

The above procedure is repeated with a mixture of 89 parts of the lauryl-myristyl methacrylate, 3 parts of diethylaminoethyl methacrylate, and 8 parts of 1-vinyl-3,3-dimethyl pyrrolidinone, using the same weights of 53% of diisopropylbenzene hydroperoxide and quaternary ammonium chloride shown above. The product is a 29.9% copolymer solution in toluene with a viscosity of 520 centistokes at 100° F. It is transferred to oil in the usual way. When added to fuel oil at 0.001% to 0.1%, it acts as a powerful dispersant for gums which tend to form therein. When added to a lubricating oil, it raises the viscosity index thereof and supplies dispersancy. In the C.R.C. FL–2 test this product gives a rating of about 85.

The above procedure is again followed with a mixture of 88 parts of the lauryl-myristyl methacrylate, 4 parts of pyrrolidinoethyl methacrylate, and 8 parts of 1-vinyl-3,3-dimethyl pyrrolidinone, using the same weights of diisopropylbenzene hydroperoxide and quaternary ammonium chloride used above. The product is a 30.1% copolymer solution in toluene with a viscosity of 484 centistokes at 100° F. In fuel oil this copolymer acts as a dispersant for gums which tend to form therein. After transfer to a light mineral oil this copolymer is applied to lubricating oils with beneficial results. It raises the viscosity index of a 170 S.U.S. solvent refined Mid-Continent neutral oil from 97 to 140 when the copolymer is used at 1.5%. It is a very good dispersant for asphaltenes.

Similar copolymers are readily prepared in the same way based on an alkyl methacrylate in which the alkyl group is of at least 8 carbon atoms or a mixture of alkyl methacrylates, the average carbon content of the alkyl groups being at least eight, an N-vinyl pyrrolidinone, and a tert-aminoalkyl methacrylate in which the tertiary amine group is piperidino. The copolymers have the properties described above and for practical purposes are indistinguishable from those having units from pyrrolidinoethyl and pyrrolidinopropyl methacrylates. Likewise, acrylates can be used instead of methacrylates in forming the tert-aminoalkyl esters.

The above procedure is again repeated but with a mixture of 90 parts of the lauryl-myristyl methacrylate, one part of morpholinoethyl methacrylate, and 9 parts of 1-vinyl-4,5-dimethyl pyrrolidinone and the same weights of diisopropylbenzene hydroperoxide and quaternary ammonium chloride as above. The product is diluted with toluene to a 30% copolymer content. The yield of copolymer is over 90%. The toluene solution has a viscosity of 489 centistokes at 100° F. The copolymer is a good dispersant for asphaltenes and also for the gums which form in fuel oils from cracked stocks.

It is an interesting observation that the various copolymers which have been described are compatible with a wide variety of other kinds of oil additives, including inhibitors, anti-rust agents, stabilizers, pour point depressants, anti-foam agents, and heavy duty detergents.

*Example 11*

There are copolymerized in the same way as in the previous examples a mixture of 30 parts of a stearyl methacrylate, 35 parts of a lauryl-myristyl methacrylate, 25 parts of n-butyl methacrylate, 2 parts of dimethylaminoethyl methacrylate, and 8 parts of N-vinyl pyrrolidinone. The yield of copolymer is over 90%. A 30% solution thereof in toluene has a viscosity of 412 centistokes at 100° F.

The copolymer is transferred to a light petroleum oil as above and incorporated at 1.5% in a 170 S.U.S. solvent refined Mid-Continent neutral oil. There are also used 0.65% of the zinc dialkyldithiophosphate inhibitor and 4.2% (by volume) of the above mentioned commercial heavy duty detergent. In an FL-2 test this composition gives a rating of 90+.

In a 36 hour L-4 test for high temperature corrosion and oxidation stability under SAE 30 conditions there is a loss in weight of copper-lead bearing as follows: No. 1, 0.05 gram; No. 6, 0.023 gram. The rating is 95.5.

In a single cylinder compression-ignition engine test this composition shows 3% top ring groove filling in 50 hours, 4.5% TRGF in 75 hours, and 6.5% TRGF in 100 hours. The oil plus the same inhibitor plus the same commercial heavy detergent but with 1.5% of an acrylic ester copolymer for V.I. improvement in place of the above copolymer gives 8.5% TRGF at 25 hours and 15% TRGF at 50 hours, and also 2% filling in the second ring groove, after which the test cannot be continued because of ring sticking.

The procedure just above is repeated with a mixture of 30 parts of stearyl methacrylate, 35 parts of lauryl-myristyl methacrylate, 25 parts of butyl methacrylate, 2 parts of dimethylaminoethyl acrylate, and 8 parts of N-vinyl pyrrolidinone. Again, the yield of copolymer is over 90%. A 30% solution in toluene has a viscosity of 421 at 100° F. It is a good dispersant for asphaltenes and sludge in oils and has properties essentially the same as those of the previous copolymer.

For evaluation of the copolymers of this invention in catalytically cracked furnace oil the Cities Service test (see Analytical Chemistry 24, 1959 (1952)) has been used. The oil is subjected to oxidation at 250° F. and then passed through a filter with #1 filter paper. The time of filtering is noted. The sample of furnace oil used requires over 2,000 seconds for filtering after oxidation. Upon addition of a copolymer from 90 parts of a mixture of stearyl, lauryl, and butyl methacrylates in roughly similar weights and 10 parts of N-vinyl pyrrolidinone in a concentration of 0.01% in the oil a filtering time of 283 seconds is found. At 0.002% of this same copolymer the filtering time of 145 seconds is obtained.

Tests with another copolymer from 90 parts of a similar mixture of methacrylate and 10% of N-vinyl pyrrolidinone gives a filtering time of 161 seconds with the copolymer used at 0.005% in the above furnace oil.

This same copolymer applied to a jet fuel at 0.01% which is then heated to 400° F. and pumped through a filter at 500° F. maintains circulation of this fuel oil for over 300 minutes without a measurable increase in pressure. This fuel oil without added copolymer can be circulated for only 77 minutes before the pressure builds up exorbitantly.

The dispersing action of the copolymers of this invention is obtained in fuel oils with about 0.001% to about 0.1% or more by weight of one or more of the copolymers of this invention. Concentrations above 0.1% are effective but usually uneconomical, since they are unnecessary.

Fuel oils comprise hydrocarbon distillates boiling from close to gasolines up to light lubricating oils. They are variously called kerosenes, furnace oils, burner oils, Diesel fuels, and jet fuels, the last including various distillates which may contian some gasoline.

These distillates may be straight-run or cracked oils or mixtures of such oils. In the storage and handling of fuel oils, there may be development of colors, sludges, and sediments which result in deposits at orifices or on screens and in other parts of equipment for handling and using these oils.

In lubricating oils dispersing action begins at quite low concentrations, but for practical purposes under the conditions of use of these oils, copolymer is generally used between about 0.1% and 20% of the weight of the oil, an amount from 0.5% to 5% being preferred.

Lubricating oils include mineral oils varying in viscosity from spindle oils to reciprocating aircraft engine oils. The common oils for sparking combustion and compression ignition engines are sold under grades commonly identified as S.A.E. 10 up through those identified as S.A.E. 50 and the like, such engine oils or motor oils being of great but not exclusive importance in the preparation of compositions of this invention. These lubricating compositions of this invention also include automatic transmission fluids and the like.

I claim:
1. As a new composition of matter, a mineral oil having dissolved therein a minor proportion importing dispersing action of a copolymer of an N-vinyl pyrrolidinone and at least one acrylic ester $ROOCC(R^x)=CH_2$, the N-vinyl pyrrolidone supplying about 5% to 30% by weight of the copolymer and R being the alkyl portion of the said ester and of sufficient size to provide solubility of the copolymer in the oil and having an average size of at least eight carbon atoms, in the formula $R^x$ representing a member of the class consisting of hydrogen and the methyl group.

2. As a new composition of matter, a mineral oil having dissolved therein a minor proportion imparting dispersing action of a copolymer from (1) 5% to 30% by weight of the copolymer of an N-vinyl pyrrolidinone, (2) 36% to 95% of at least one acrylic ester of the formula $ROOCC(R^x)=CH_2$, wherein R represents the alkyl portion and $R^x$ represents a member of the class consisting of hydrogen and the methyl group, the alkyl portion being of sufficient size and in proportion to provide solubility of copolymer in a said oil and having an average size of at least eight carbon atoms, and (3) 0% to 47% of at least one other polymerizable monovinylidene compound selected from the group consisting of alkyl esters, vinyl esters and ethers, and aminoalkyl esters having the formula $CH_2=C(R^x)COOC_nH_{2n}NR^0R^*$, wherein $R^x$ is a member of the class consisting of hydrogen and the methyl group, $n$ is an integer from two to three, $C_nH_{2n}$ is an alkylene chain of at least two carbon atoms and $R^0$ and $R^*$ when taken individually are alkyl groups of not over four carbon atoms each and when taken together are saturated divalent chains from the group consisting of $-CH_2CH_2CH_2CH_2-$, $-CH_2CH_2CH_2CH_2CH_2-$, and $-CH_2CH_2OCH_2CH_2-$.

3. A mineral lubricating oil having dissolved therein between 0.1% and 20% by weight of a copolymer from (1) 5% to 30% by weight of the copolymer of an N-vinyl pyrrolidinone, (2) 36% to 95% of at least one acrylic ester of the formula $ROOCC(R^x)=CH_2$, wherein R represents the alkyl portion and $R^x$ represents a member of the class consisting of hydrogen and the methyl group, the alkyl portion being of sufficient size and in proportion to provide solubility of copolymer in a said oil and having an average size of at least eight carbon atoms, and (3) 0% to 47% of at least one other polymerizable monovinylidene compound selected from the group consisting of alkyl esters, vinyl esters and ethers, and aminoalkyl esters having the formula $$CH_2=C(R^x)COOC_nH_{2n}NR^0R^*$$

wherein $R^x$ is a member of the class consisting of hydrogen and the methyl group, $n$ is an integer from two to three, $C_nH_{2n}$ is an alkylene chain of at least two carbon atoms and $R^0$ and $R^*$ when taken individually are alkyl groups of not over four carbon atoms each and when taken together are saturated divalent chains from the group consisting of $-CH_2CH_2CH_2CH_2-$, $$-CH_2CH_2CH_2CH_2CH_2-$$

and $$-CH_2CH_2OCH_2CH_2-$$

4. A mineral lubricating oil having dissolved therein from 0.1% to 20% by weight of the oil of a copolymer from (1) 5% to 30% by weight of the copolymer of an N-vinyl pyrrolidinone of not over ten carbon atoms and (2) 70% to 95% by weight of the copolymer of a plurality of alkyl methacrylates, 30% to 80% of the alkyl groups thereof having chains of 16 to 18 carbon atoms and the rest of the alkyl groups being smaller than sixteen carbon atoms, the average size of alkyl group being sufficient to provide solubility of copolymer in a said oil.

5. A mineral lubricating oil having dissolved therein from 0.1% to 20% by weight of the oil of a copolymer from (1) 5% to 30% by weight of the copolymer of an N-vinyl pyrrolidinone of not over ten carbon atoms, (2) 0.5% to 10% of a nitrogenous ester of the formula $CH_2=C(R^x)COOC_nH_{2n}NR^0R^*$, wherein $R^x$ is a member of the class consisting of hydrogen and the methyl group, $n$ is an integer from two to three, $C_nH_{2n}$ is an alkylene chain of at least two carbons atoms and $R^0$ and $R^*$ when taken individually are alkyl groups of not over four carbon atoms each and when taken together are saturated divalent chains from the group consisting of $$-CH_2CH_2CH_2CH_2-, \quad -CH_2CH_2CH_2CH_2CH_2-$$

and $$-CH_2CH_2OCH_2CH_2-$$

and (3) in a percentage to make 100% at least one acrylic ester $ROOCC(R^x)=CH_2$, R being the alkyl portion of sufficient size and in proportion to provide solubility of copolymer in said oil and having an average size of at least eight carbon atoms, and $R^x$ being as above defined.

6. A mineral lubricating oil having dissolved therein from 0.5% to 5% of the weight of the oil of a copolymer from (1) 6% to 15% by weight of the copolymer of N-vinyl pyrrolidinone, (2) 0.5% to 10% by weight of dimethylaminoethyl methacrylate, and (3) a percentage to make 100% at least one alkyl methacrylate, the alkyl portion of which is of sufficient size to provide solubility of copolymer in a said oil and have an average size of at least eight carbon atoms.

7. A lubricating composition according to claim 6 in which the oil is of a grade used in a spark ignition engine.

8. A mineral lubricating oil having dissolved therein 0.1% to 5% by weight of the oil of a copolymer from (1) 6% to 15% by weight of copolymer of N-vinyl pyrrolidinone and (2) 94% to 85% of a plurality of alkyl methacrylates in which the alkyl groups provide solubility of copolymer in a said oil and have an average size of at least eight carbon atoms.

9. A fuel oil having dissolved therein from about 0.001% to 0.1% by weight of oil of a copolymer of an N-vinyl pyrrolidinone and at least one acrylic ester $ROOCC(R^x)=CH_2$, the N-vinyl pyrrolidone supplying about 5% to 30% by weight of the copolymer and R being the alkyl portion of the said ester and of sufficient size to provide solubility of the copolymer in the oil and having an average size of at least eight carbon atoms, in the formula $R^x$ representing a member of the class consisting of hydrogen and the methyl group, and said copolymer imparting dispersing activity.

10. A fuel oil having dissolved therein from about 0.001% to 0.1% by weight of oil of a copolymer from (1) 5% to 30% by weight of the copolymer of an N-vinyl pyrrolidinone, (2) 36% to 95% of at least one acrylic ester of the formula $ROOCC(R^x)=CH_2$, wherein R represents the alkyl portion and $R^x$ represents a member of the class consisting of hydrogen and the methyl group, the alkyl portion being of sufficient size and in proportion to provide solubility of copolymer in a said oil and having an average size of at least eight carbon atoms, and (3) 0% to 47% of at least one other polymerizable monovinylidene compound selected from the group consisting of alkyl esters, vinyl esters and ethers, and aminoalkyl esters having the formula $CH_2=C(R^x)COOC_nH_{2n}NR^0R^*$, wherein $R^x$ is a member of the class consisting of hydrogen and the methyl group, $n$ is an integer from two to three, $C_nH_{2n}$ is an alkylene chain of at least two carbon atoms and $R^0$ and $R^*$ when taken individually are alkyl groups of not over four carbon atoms each and when taken together are saturated divalent chains from the group consisting of $-CH_2CH_2CH_2CH_2-$, $$-CH_2CH_2CH_2CH_2CH_2-$$

and $$-CH_2CH_2OCH_2CH_2-$$

11. A fuel oil having dissolved therein from about 0.001% to about 0.1% by weight of a copolymer from (1) 5% to 30% by weight of the copolymer of an N-vinyl pyrrolidinone of not over ten carbon atoms and 70% to 95% by weight of the copolymer of a plurality of alkyl methacrylates, 30% to 80% of the alkyl groups thereof having chains of 16 to 18 carbon atoms and the rest of the alkyl groups being smaller than sixteen carbon atoms, the average size of alkyl group being sufficient to provide solubility of copolymer in a said oil.

12. A fuel oil having dissolved therein from about 0.001% to about 0.1% by weight of a copolymer from 6% to 15% by weight of copolymer of N-vinyl pyrrolidinone and (1) 94% to 85% of at least one alkyl methacrylate, the alkyl portion of which is of sufficient size and proportion to provide solubility of copolymer in a said oil.

13. A fuel oil having dissolved therein from about 0.001% to about 0.1% by weight of a copolymer from (1) 5% to 30% by weight of the copolymer of an N-vinyl pyrrolidinone, of not over ten carbon atoms, (2) 0.5% to 10% of a nitrogenous ester of the formula $$CH_2=C(R^x)COOC_nH_{2n}NR^oR^*$$

wherein $R^x$ is a member of the class consisting of hydrogen and the methyl group, $n$ is an integer from two to three, $C_nH_{2n}$ is an alkylene chain of at least two carbon atoms and $R^o$ and $R^*$ when taken individually are alkyl groups of not over four carbon atoms each and when taken together are saturated divalent chains from the group consisting of —$CH_2CH_2CH_2CH_2$—,

—$CH_2CH_2CH_2CH_2CH_2$— and

—$CH_2CH_2OCH_2CH_2$— and (3) in a percentage to make 100% at least one acrylic ester $ROOCC(R^x)=CH_2$, R being the alkyl portion of sufficient size and in proportion to provide solubility of copolymer in a said oil and having an average size of at least eight carbon atoms, and $R^x$ being as above defined.

14. A fuel oil having dissolved therein from about 0.001% to about 0.1% by weight of a copolymer from (1) 6% to 15% by weight of the copolymer of N-vinyl pyrrolidinone, (2) 0.5% to 10% by weight of dimethylaminoethyl methacrylate, and (3) a percentage to make 100% at least one alkyl methacrylate, the alkyl portion of which is of sufficient size to provide solubility of copolymer in said oil and of an average size of at least eight carbon atoms.

15. A fuel oil having dissolved therein from about 0.001% to about 0.1% by weight of a copolymer from (1) 5% to 30% by weight of copolymer of N-vinyl pyrrolidinone and (2) 95% to 70% by weight of at least one alkyl acrylate, the alkyl portion being of sufficient size and in proportion to provide solubility of copolymer in a said oil.

16. A mineral lubricating oil having dissolved therein a minor amount from about 0.1% to about 20% by weight of an oil-soluble copolymer of N-vinyl-2-pyrrolidone with an ester from the group consisting of alkyl acrylates and alkyl methacrylates, said alkyl group containing at least 8 carbon atoms and the N-vinyl-2-pyrrolidone supplying about 5% to 30% by weight of the copolymer.

References Cited in the file of this patent

UNITED STATES PATENTS

| | | |
|---|---|---|
| 2,497,705 | Werntz | Feb. 14, 1950 |
| 2,584,968 | Catlin | Feb. 12, 1952 |
| 2,737,496 | Catlin | Mar. 6, 1956 |

FOREIGN PATENTS

| | | |
|---|---|---|
| 523,588 | Italy | Apr. 16, 1955 |
| 532,975 | Belgium | Apr. 30, 1955 |